March 5, 1929. J. W. FRANKLIN, JR 1,704,286
LOCKING MEANS AND COVER FOR VALVE STEMS
Filed March 13, 1928
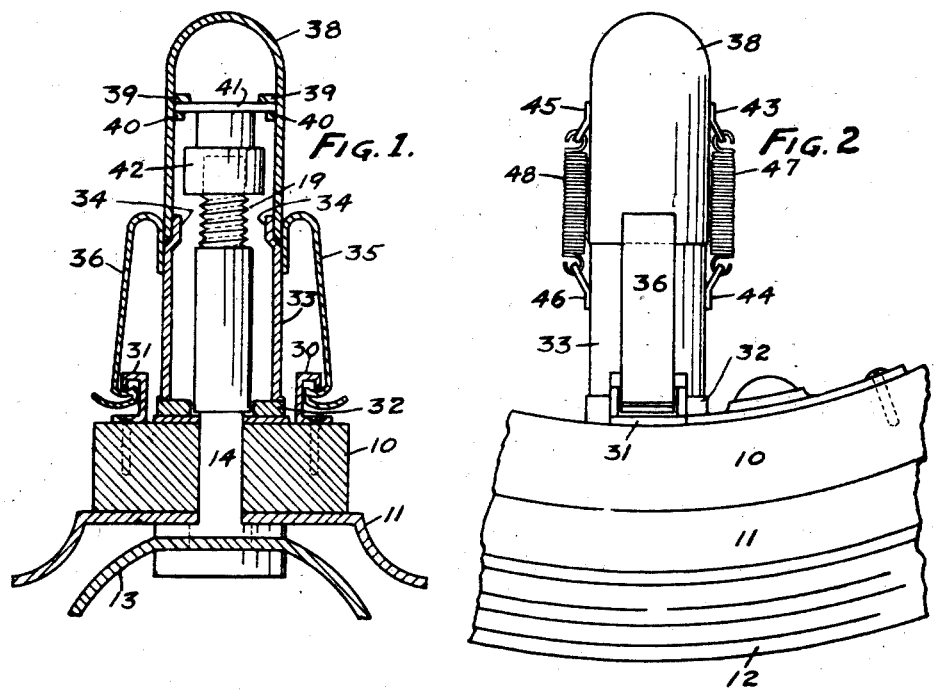

Patented Mar. 5, 1929.

1,704,286

UNITED STATES PATENT OFFICE.

JAMES W. FRANKLIN, JR., OF LEWISVILLE, NORTH CAROLINA.

LOCKING MEANS AND COVER FOR VALVE STEMS.

Application filed March 13, 1928. Serial No. 261,251.

My invention relates to an improved dust cap for tire valves which may be instantly removed from the valve without the necessity of unscrewing the same.

An object of my invention is to provide a valve stem and a dust cap therefor, provided with means for instantly removing the top portion of the dust cap when it is desired to replenish the supply of air, said dust cap also having means for being quickly attached to and detached from the felly of the automobile wheel.

Some of the objects of my invention having been stated, other objects will appear as the description proceeds when taken in connection with the accompanying drawings, in which—

Figure 1 is a cross sectional view taken through my device at a point slightly in advance of the center thereof;

Figure 2 is a side elevation of my device and the associated tire and felly.

Referring more particularly to the drawings, the numeral 10 indicates the felly of an automobile wheel, while 11 indicates the conventional rim used therewith, which rim is adapted to serve to accommodate the casing 12 and the inner tube 13. A valve stem 14 is secured in the inner tube 13 in a conventional manner and the upper portion thereof is threaded in the conventional manner as indicated at 19, these threads being shown in a mutilated condition for the purpose of showing that my dust cap, which will be later described, can be used on valve stems with mutilated threads or with no threads at all.

I provide a special dust cap, and in so providing this dust cap I secure the members 30 and 31 to the felly 10 and provide the rubber washer 32 to fit around the valve stem against the felly and the tubular member 33 fits around the valve stem and against the rubber washer, which tubular member is slightly restricted as at 34 and immediately below this restricted portion I secure by welding or other suitable means, the spring clips 35 and 36, the lower portions of which are adapted to fit into the members 31 and 32 and hold this housing securely against the rubber washer 32. In addition to the housing 33 I provide the cap 38 which is adapted to fit over the restricted portion 34 and this cap has the two annular members 39 and 40 secured on the inside thereof and between these annular members 39 and 40, the rubber member 41 is adapted to be fitted which has the portion 42 to fit over the top of the valve stem 14. In order to hold this cap 38 in position and to permit easy removal I secure the lugs 43, 44, 45 and 46 to the upper and lower portions of the dust protector and between the lugs 43 and 44 I provide the tension spring 47 and between the lugs 45 and 46 I also provide the tension spring 48 as is illustrated in Figure 2.

In the drawings and specification I have set forth a preferred embodiment of my invention, and although specific terms are employed they are used in a generic and descriptive sense only and not for purposes of limitation, the scope of my invention being set forth in the appended claims.

I claim:

1. A valve cap formed of a tubular housing cut into upper and lower sections, the lower section being adapted to be releasably secured around the valve stem, and the upper section being adapted to fit over the upper end of the lower section, tension means for holding the upper section in position on the upper end of the lower section and to permit the same to be pulled upward and to one side, and a plug in the upper section adapted to fit over the upper end of the valve stem.

2. A valve tube cap formed of a cylindrical section and a cap-like covering universally hinged to the upper end of the cylindrical section, releasable spring devices secured to the cylindrical section, members adapted to be secured to the felly of an automobile wheel adapted to receive the spring devices to hold the cylindrical section in position around the valve stem.

3. In a dust cap for valve stems, hooked members adapted to be secured to the felly of an automobile wheel, and a cylindrical member adapted to fit around the valve stem and having spring members secured thereto and adapted to be fitted into the hooked members, a cylindrical cap adapted to be fitted over the top of the cylindrical section, lugs secured to the cylindrical section and to the said cap, tension springs secured between the said lugs, and a cap secured within the upper cylindrical cap and being adapted to fit over the end of the valve stem.

In testimony whereof I affix my signature.

JAMES W. FRANKLIN, JR.